INVENTOR.
Charles F. Hause
BY A.B.Bowman
ATTORNEY.

Patented June 24, 1941

2,247,235

UNITED STATES PATENT OFFICE 2,247,235

LAVATORY LEG COUPLING

Charles F. Hause, Los Angeles, Calif.

Application March 4, 1940, Serial No. 322,143

6 Claims. (Cl. 4—170)

My invention relates to a lavatory leg coupling for use in connecting various types of lavatories with supporting legs therefor and the objects of my invention are:

First, to provide a lavatory leg coupling of this class which is arranged for use in connection with various types of lavatory fittings, without any change or modification of the elements thereof;

Second, to provide a lavatory leg coupling of this class which is very simple and easy to apply to various types of lavatory leg mountings;

Third, to provide a lavatory leg coupling of this class which is adjustable and very sturdy in its various applications;

Fourth, to provide a lavatory leg coupling of this class which is very compact, neat and which is arranged to be positioned well out of sight beneath the skirt of lavatories;

Fifth, to provide a lavatory leg coupling of this class which is perfectly fitted and readily adjustable for use in connection with various lavatory mountings; and Sixth, to provide a lavatory leg coupling of this class which is very simple and economical of construction, efficient, versatile and which will not readily deteriorate or get out of order.

Figures 1, 2, 3:
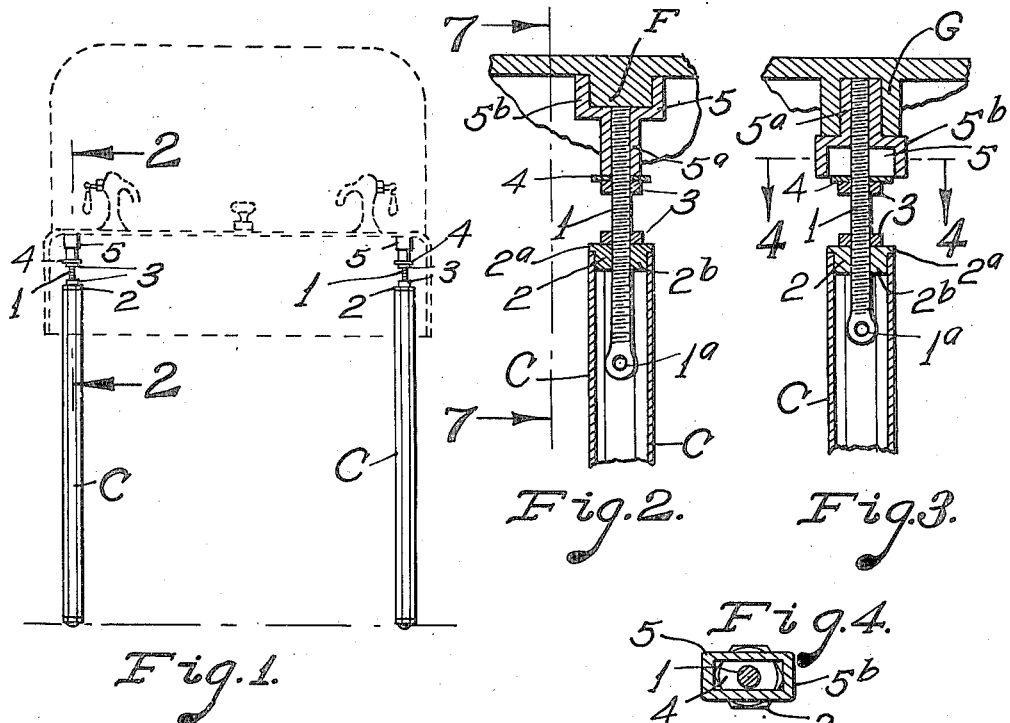
Figure 4:
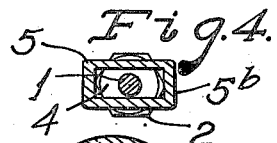
Figures 5, 6:
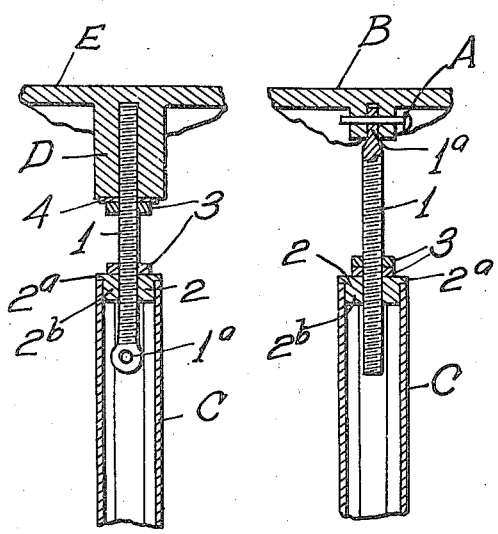
Figure 7:
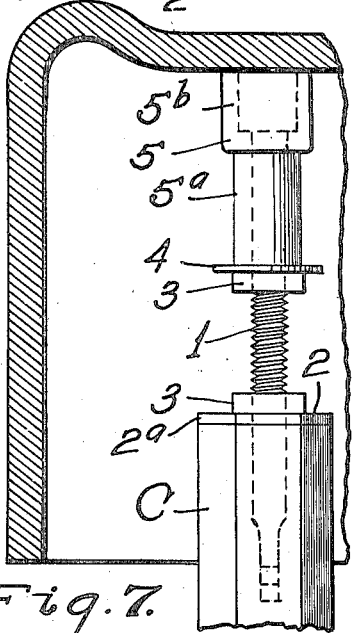

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a diagrammatic view of a lavatory shown by dash lines with supporting legs showing two of my lavatory leg couplings in connection therewith by solid lines; Fig. 2 is an enlarged fragmentary sectional view taken from the line 2—2 of Fig. 1 showing a part in elevation to facilitate the illustration; Fig. 3 is a similar view to that of Fig. 2 showing the adaptation of my lavatory leg coupling in connection with a different type of lavatory mounting; Fig. 4 is a transverse sectional view taken from the line 4—4 of Fig. 3; Fig. 5 is a similar view to that shown in Fig. 3 showing another type of lavatory mounting supported on my lavatory leg coupling; Fig. 6 is a similar view to that shown in Fig. 5 showing the adaptation of my lavatory leg coupling supporting a still different type of lavatory and Fig. 7 is an enlarged fragmentary sectional view taken from the line 7—7 of Fig. 2.

Similar characters of reference refer to similar parts and portions throughout the several views of the drawing:

The coupling bolt 1, coupling bolt supporting nut 2, lock nuts 3, washer 4 and the lug engaging member 5 constitute the principal parts and portions of my lavatory leg coupling.

The coupling bolt 1 is substantially the shape as shown in Fig. 2 of the drawing and is screw threaded nearly its entire length and is provided with an eye bolt portion 1a on its one end. This eye bolt portion 1a is arranged for use in connection with lavatories as shown best in Fig. 6 of the drawing. This eye bolt portion 1a is arranged to be positioned between the downwardly extending lug portion of a conventional lavatory B, wherein a pin A is positioned and extended through the eye bolt portions 1a, as shown best in Fig. 6 of the drawing.

The coupling bolt supporting nut 2 is screw threaded on the coupling bolt 1 and is provided with outwardly extended flange portions 2a which are arranged to rest on the upper end of the lavatory leg C. The portion 2b of this coupling bolt supporting nut 2 is positioned inside the lavatory leg C and extending downwardly some distance from the upper end thereof.

The lock nuts 3 are screw threaded on the coupling bolt 1 and are arranged to lock the coupling bolt 1 in rigid position relatively to the coupling bolt supporting nut 2. The lock nuts 3 are also arranged for use in holding the washer 4 in contact with the lug engaging member 5, as shown best in Figs. 2 and 3 of the drawing and one of the lock nuts 3 as shown in Fig. 5 of the drawing is arranged to hold the washer 4 in rigid position relatively to the downwardly extending lug portions D of the lavatory E in which one end of the coupling bolt 1 is screw threaded.

The lug engaging member 5 is provided with a substantially annular in cross section portion 5a and a substantially rectangular hollow box like portion 5b, as shown best in Figs. 2 and 3 of the drawing. It will be noted that the boss portion 5a of this lug engaging member 5 is internally screw threaded and arranged to engage the coupling bolt 1 and may be positioned on the coupling bolt 1 with the box like portion 5b extending upwardly, as shown in Fig. 2 of the drawing, or it may be positioned on the coupling bolt 1 with the boss portion 5a extending upwardly, as shown best in Fig. 3 of the drawing. The box-like portion 5b is arranged to support a lug portion F therein, as shown best in Fig. 2 of the drawing, which is provided on certain type of lavatories and the boss portion 5a of the lug engaging member 5 is arranged to engage a recess in the lug G, as shown best in Fig. 3 of the drawing. This type of lug, as indicated at G is provided on another type of lavatory.

The operation of my lavatory leg coupling is substantially as follows:

When it is desired to adjust the relative relation between the lavatory leg C and lavatory supported thereon, the screw threaded relation of the coupling bolt 1 and the coupling bolt supporting nut 2 may be slightly changed one way or the other to provide the desired elevated support of the lavatory on the lavatory leg C. It will be noted that one adaptation of my lavatory leg coupling is shown in Fig. 2 of the drawing; another adaptation is shown in Fig. 3 of the drawing; two other adaptations are shown in Figs. 5 and 6 of the drawing.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a lavatory leg coupling of the class described, the combination with a lavatory and a lavatory supporting leg, of a coupling bolt supporting said lavatory at its one end and adjustably supported on said lavatory leg at its other end, and a separate coupling bolt supporting nut screw threaded on said coupling bolt and positioned on the upper end of said lavatory leg.

2. In a lavatory leg coupling of the class described, the combination with a lavatory and a lavatory supporting leg, of a coupling bolt supporting said lavatory at its one end and adjustably supported on said lavatory leg at its other end, a separate coupling bolt supporting nut screw threaded on said coupling bolt and positioned on the upper end of said lavatory leg, and a lug engaging member screw threaded on said coupling bolt in opposed relation to said coupling bolt supporting nut above said lavatory leg.

3. In a lavatory leg coupling of the class described, the combination with a lavatory and a lavatory supporting leg, of a coupling bolt adjustably supported on said lavatory leg and a lavatory lug engaging member reversibly positioned on said coupling bolt and arranged to support said lavatory thereon.

4. In a lavatory leg coupling of the class described, the combination with a lavatory and a lavatory supporting leg, of a coupling bolt adjustably supported on said lavatory leg and a lavatory lug engaging member reversibly positioned on said coupling bolt and arranged to support said lavatory thereon, said lug engaging member provided with a box like portion on one end and an annular in cross section boss portion on its other end.

5. In a lavatory leg coupling of the class described, the combination with a lavatory and a lavatory supporting leg, of a coupling bolt adjustably supported on said lavatory leg, a lavatory lug engaging member reversibly positioned on said coupling bolt and arranged to support said lavatory thereon, said lavatory lug engaging member provided with a box like portion on one end and an annular in cross section boss portion on its other end, and lock nuts on said coupling bolt arranged to secure said coupling bolt in fixed position relatively with said lavatory lug engaging member.

6. In a lavatory leg coupling of the class described, the combination with a lavatory and a lavatory supporting leg, of a coupling bolt supporting said lavatory at its one end and adjustably supported on said lavatory leg at its other end, a coupling bolt supporting nut screw threaded on said coupling bolt and positioned on the upper end of said lavatory leg, a lavatory lug engaging member screw threaded on said coupling bolt in opposed relation to said coupling bolt supporting nut, and lock nuts on said coupling bolt arranged to secure said coupling bolt in fixed relation with said coupling bolt supporting nut and said lavatory lug engaging member.

CHARLES F. HAUSE.